UNITED STATES PATENT OFFICE.

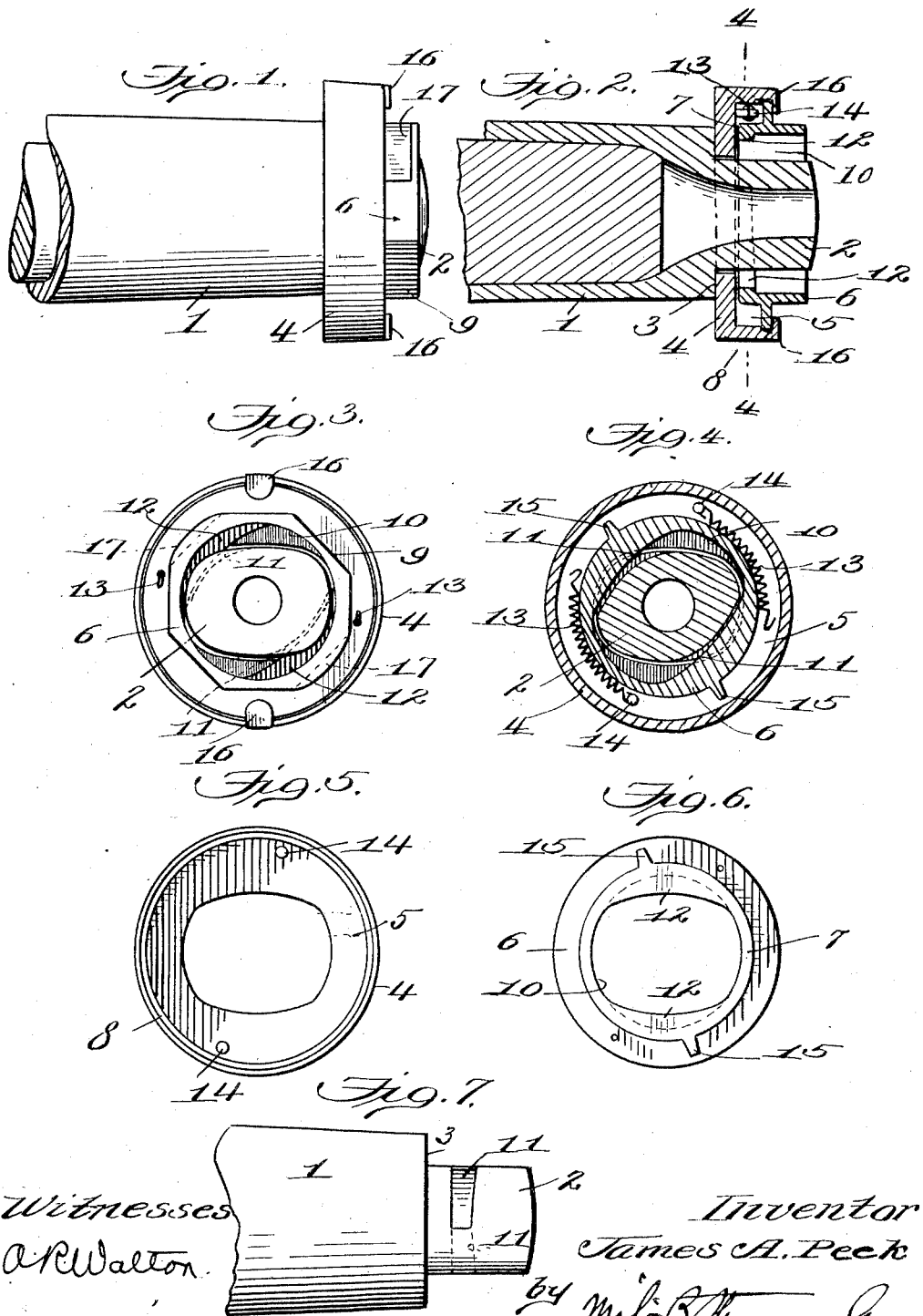

JAMES A. PEEK, OF SPRINGFIELD, MISSOURI, ASSIGNOR OF ONE-HALF TO THOMAS A. STONE, OF NORTH MANCHESTER, INDIANA.

HUB-ATTACHING DEVICE.

1,009,854.      Specification of Letters Patent.      Patented Nov. 28, 1911.

Application filed February 23, 1911. Serial No. 610,290.

*To all whom it may concern:*

Be it known that I, JAMES A. PEEK, a citizen of the United States, residing at Springfield, in the county of Greene and State of Missouri, have invented certain new and useful Improvements in Hub-Attaching Devices, of which the following is a specification.

This invention relates to devices for securing wheels on their axles, and more particularly to a device of this character which is carried at the outer end of the axle spindle and engages the corresponding end of the wheel hub, thereby preventing the wheel from slipping off the spindle.

It is the object of the present invention to provide a fastening device of the kind stated which is simple in construction, and which, when in locking position, securely holds the wheel in place.

With the herein-stated objects in view, the invention consists in a novel construction and arrangement of parts to be hereinafter described and claimed.

The invention is illustrated in the accompanying drawing forming a part of this specification, in which drawing—

Figure 1 is an elevation of a fragment of the axle showing the hub attaching device thereon. Fig. 2 is a longitudinal section. Fig. 3 is an end view. Fig. 4 is a cross-section on the line 4—4 of Fig. 2. Fig. 5 is a face view of the stop collar. Fig. 6 is a rear face view of the locking nut. Fig. 7 is an elevation of the end of the axle spindle.

Referring specifically to the drawing, 1 denotes the skein of an axle; or it may be the axle spindle. The end of this part is reduced as indicated at 2 to form a square shoulder 3 against which a stop collar 4 mounted on said reduced end abuts. This stop collar fits against the outer end of the hub (not shown) in a well known manner to prevent the wheel from slipping off the axle. The part 2 is oblong or elliptical in cross section, and the collar 4 has a corresponding hole to receive said part, whereby the collar is held against rotation. The outer face of the collar has a recess 5 in which seats a nut 6 for locking said collar in place. The nut has a reduced portion 7 which extends into the recess in spaced relation with the wall thereof and the edge of the recessed portion of the collar has a rabbet 8 in which the edge of the nut seats so that the recess 5 is closed by the nut. On the outer face of the nut is an angular portion 9 to facilitate the application of a wrench. That portion of the nut which seats in the recess 5 and in the rabbet 8 is circular so that the nut may be turned to locking position as will be presently described. The nut has an opening 10 so that it may be slipped over the part 2. The nut opening is circular, its diameter being equal to the length of the major axis of the part 2, so that the nut may be slipped over the same. The surface of the part 2 has diametrically opposite grooves 11, and within the nut opening 10, at diametrically opposite points, are outstanding flanges 12 which are adapted to enter said grooves when the nut is in locking position. There is sufficient space between the flanges so that the nut may be slipped over the part 2, and after this is done the nut is given a slight turn, whereupon the flanges enter the grooves 11 and the nut is then held on the part 2 against endwise separation.

Means are provided for automatically turning the nut 10 into locking position. These means comprise two diametrically opposite coiled springs 13 seating in the recess 5. These springs are secured at one of their ends to the nut by being hooked through apertures therein as shown in Fig. 3, and at their other ends to pins 14 extending from the inner end of the recess, and they are arranged so that they have a tendency to pull the nut around or to turn the same to the position where the flanges 12 seat in the grooves 11. To release the nut it is necessary to turn the same against the tension of the springs until the flanges are out of the grooves, after which the nut may be removed, thus unlocking the collar 4 and permitting the removal thereof. On the edge of the reduced portion 7 of the nut are diametrically opposite lugs 15 which are adapted to come in contact with the pins 14 when the nut is in released position, thus indicating to the operator when the nut has been turned sufficiently to disengage the flanges 12 from the grooves 11. The operator therefore need not watch the parts, but needs only to turn the nut until it is stopped by the engagement of the lugs with the pins, and then remove the nut endwise.

On the collar 4 are tongues 16 which extend over the outer face of the nut 6, so that when the nut is turned into unlocking position and slipped off the axle, the collar will also come off.

It will be noted that the grooves 11 are in the widest portion of the part 2, and the inner ends of said grooves are inclined, whereby cam surfaces are formed against which the flanges are jammed when the nut is turned to locking position, and which prevents the nut from being turned so far in this direction as to disengage the flanges from the grooves.

By the structure herein described, the collar 4 is securely locked in place, and can be readily placed on the axle or removed therefrom.

The parts constituting the device are few and simple and they effectually serve the purpose for which they are designed.

To facilitate the application of a wrench to the angular portion 9 of the nut, the sides thereof, at two diametrically opposite points, may be formed with grooves 17 to receive the jaws of a spanner wrench.

I claim:

The combination with an axle having a reduced outer end to form a shoulder, and said outer end being non-circular in cross-section and having a grooved surface, a collar and a nut mounted on said reduced end of the axle, the nut having a reduced portion, and the collar abutting on one side against the shoulder, the opposite side of the collar having a recess into which the reduced portion of the nut extends in spaced relation with the side wall of said recess, outstanding flanges in the bore of the nut adapted to enter the aforesaid grooves, springs mounted in the space between the reduced portion of the nut and the side wall of the recess, said springs being connected at one of their ends to the collar and at their opposite ends to the nut, and being arranged to turn the nut to a position where its flanges seat in the grooves, projecting lugs on the reduced portion of the nut, and pins extending from the collar into the aforesaid space between the reduced portion of the nut and the side wall of the recess, said pins being in the path of the lugs and coöperating therewith to form stops determining the position of the nut when the flanges thereof are disengaged from the grooves.

In testimony whereof I affix my signature in presence of two witnesses.

JAMES A. PEEK.

Witnesses:
T. C. OPDYCKE,
P. B. WILEY.

---

Copies of this patent may be obtained for five cents each, by addressing the "Commissioner of Patents, Washington, D. C."